(12) United States Patent
Takeuchi et al.

(10) Patent No.: US 7,466,499 B2
(45) Date of Patent: Dec. 16, 2008

(54) PROJECTOR

(75) Inventors: Kesatoshi Takeuchi, Shiogiri (JP);
Hidehito Iisaka, Shiogiri (JP); Takashi Toyooka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 11/503,187

(22) Filed: Aug. 14, 2006

(65) Prior Publication Data

US 2007/0086075 A1    Apr. 19, 2007

(30) Foreign Application Priority Data

Oct. 19, 2005   (JP)   ............................. 2005-304734

(51) Int. Cl.
*G03B 21/16*   (2006.01)
(52) U.S. Cl. ...................... 359/738; 359/601; 359/739; 353/52; 362/373
(58) Field of Classification Search ................. 359/535, 359/601, 738, 739; 353/97, 52; 362/373
See application file for complete search history.

(56) References Cited

U.S. PATENT DOCUMENTS

| | | | |
|---|---|---|---|
| 5,597,223 A * | 1/1997 | Watanabe et al. | ............. 353/97 |
| 7,210,790 B2 | 5/2007 | Ishii et al. | |
| 2005/0157275 A1 * | 7/2005 | Colpaert et al. | ............. 353/97 |

FOREIGN PATENT DOCUMENTS

| | | |
|---|---|---|
| EP | 1 558 042 A3 | 7/2005 |
| JP | A 2000-112021 | 4/2000 |
| JP | A 2004-004505 | 1/2004 |
| JP | A 2004-126381 | 4/2004 |
| JP | A 2004-264668 | 9/2004 |
| JP | A 2005-55760 | 3/2005 |
| JP | A 2005-234551 | 9/2005 |
| JP | A 2006-23364 | 1/2006 |

* cited by examiner

*Primary Examiner*—Joseph Martinez
(74) *Attorney, Agent, or Firm*—Oliff & Berridge, PLC

(57) ABSTRACT

A projector with a light source device; an optical modulator for modulating a light beam irradiated by the light source device; a projection optical device for projecting the light beam modulated by the optical modulator in an enlarged manner; and an exterior casing for housing the light source device, the optical modulator, and the projection optical device, includes: an optical diaphragm disposed on an optical path between the light source device and the optical modulator, the optical diaphragm having a light shield for shielding at least a part of an incident light beam, the optical diaphragm adjusting light quantity of a light beam irradiated by the light source device by moving the light shield into and out of the optical path; a nonvisible light eliminator disposed on the downstream of the optical diaphragm on the optical path, the nonvisible light eliminator reflecting or transmitting a light beam in the nonvisible light region of the light beam irradiated by the light source device to guide the light beam in the nonvisible region out of the optical path; and a nonvisible light detector for receiving the light beam in the nonvisible light region which is guided to be out of the optical path by the nonvisible light eliminator, the nonvisible light detector outputting a light-receiving signal.

3 Claims, 10 Drawing Sheets

PROJECTOR

The entire disclosure of Japanese Patent Application No. 2005-304734, filed Oct. 19, 2005, is expressly incorporated by reference herein.

BACKGROUND

1. Technical Field

The present invention relates to a projector.

2. Related Art

There has been known a projector including: a light source device; an optical modulator for modulating a light beam irradiated by the light source device; and a projection optical device for projecting the light beam modulated by the optical modulator in an enlarged manner.

For the projector, there has been proposed an arrangement in which an optical diaphragm for adjusting light quantity of the light beam incident on the optical modulator is employed to enhance image quality of a projection image by appropriately changing a brightness of the projection image. The light quantity is adjusted by moving a light shield into and out of an optical path to shield at least a part of the light beam irradiated by a light source. However, it has been difficult to enhance the image quality of the projection image because change over time or manufacturing errors in mechanism components for driving the light shield hinder the light shield from being located at a desired position, in other words, because the projection image cannot be changed to a desired brightness.

To solve the problem, there has been proposed a projector employing a light beam detector for detecting the light quantity adjusted by the optical diaphragm, the projector driving the optical diaphragm based on the detected light quantity (see, for example, JP-A-2005-55760). In a case of such projector, even with change over time or manufacturing errors in mechanism components for driving the light shield, the image quality of the projection image can be enhanced, because the light quantity adjusted by the optical diaphragm is detected to reliably detect changes in the light quantity adjusted by the optical diaphragm.

Noted that, as the light source device for the projectors, light source lamps for generating a light beam by an electric discharge are often used. Such light source lamp for generating a light beam by an electric discharge irradiates a light beam not only in a visible light region but also in a nonvisible light region (such as an infrared region).

The projector disclosed in the above-cited document has a problem in using the light source lamp for generating a light beam by an electric discharge, in which, when the light beam including a light beam in the nonvisible light region is irradiated by the light source device on an optical component such as the optical modulator, the temperature of the optical component rises to deteriorate features of the optical component, making it difficult to appropriately maintain the image quality of the projection image.

SUMMARY

An object of the invention is to provide a projector that can enhance image quality of a projection image.

A projector according to an aspect of the invention includes: a light source device; an optical modulator for modulating a light beam irradiated by the light source device; a projection optical device for projecting the light beam modulated by the optical modulator in an enlarged manner; and an exterior casing for housing the light source device, the optical modulator, and the projection optical device. The projector includes an optical diaphragm disposed on an optical path between the light source device and the optical modulator. The optical diaphragm includes a light shield for shielding at least a part of an incident light beam to adjust light quantity of a light beam irradiated by the light source device by moving the light shield into and out of the optical path. The projector also includes a nonvisible light eliminator disposed on the downstream of the optical diaphragm on the optical path, the nonvisible light eliminator reflecting or transmitting a light beam in the nonvisible light region of the light beam irradiated by the light source device to guide the light beam in the nonvisible region out of the optical path. The projector further includes a nonvisible light detector for receiving the light beam in the nonvisible light region which is guided to be out of the optical path by the nonvisible light eliminator, the nonvisible light detector outputting a light-receiving signal.

The optical diaphragm may have any arrangement as long as the light quantity of the light beam irradiated by the light source device can be adjusted. For example, the light shield may be moved into and out of the optical path by sliding the light shield in a direction substantially orthogonal to the optical axis of the incident light beam. The light shield may be moved into and out of the optical path by rotating the light shield in a plane substantially orthogonal to the optical axis of the incident light beam or may be moved into and out of the optical path by rotating the light shield around a predetermined axis in a plane substantially orthogonal to the optical axis of the incident light beam.

According to the aforesaid aspect, since the nonvisible light detector is disposed on the downstream side of the optical diaphragm on the optical path, the nonvisible light detector receives the light beam in the nonvisible light region, which is guided out of the optical path by the nonvisible light eliminator, out of the light beam of which light quantity is adjusted by the optical diaphragm. Specifically, since the light quantity of the light beam in the nonvisible light region that the nonvisible light detector receives has a predetermined relationship with the opening area (opening ratio) of the optical diaphragm which can transmit the light beam, the nonvisible light detector can detect the opening ratio of the optical diaphragm by receiving the light beam in the nonvisible light region. The nonvisible light detector outputs a light-receiving signal in accordance with the light quantity of the received light beam in the nonvisible light region.

According to the above-described arrangement, since the nonvisible light detector detects an unnecessary light component (the light beam in the nonvisible light region) of the light beam adjusted by the optical diaphragm, the unnecessary light component being guided out of the optical path by the nonvisible light eliminator, the light quantity adjusted by the optical diaphragm, that is, the current opening ratio of the optical diaphragm (hereinafter, referred to as a second opening ratio) can be reliably detected even when the optical diaphragm includes change over time or manufacturing errors in mechanism components for driving the light shields. The brightness of the projection image can be changed, for example, by controlling the optical diaphragm based on the light-receiving signal output by the nonvisible light detector or by correcting data (a drive signal) to be written in the optical modulator, thereby enhancing image quality of the projection image.

Since the nonvisible light detector detects the unnecessary light component that has been guided out of the optical path, it can be avoided that the light beam is irradiated on the nonvisible light detector to form an unnecessary image in the image or it is not necessary that the nonvisible light detector is provided outside the projector. Hence, high image quality can be ensured with the enhanced flexibility in layout of the nonvisible light detector in the exterior casing as compared with an arrangement in which the nonvisible light detector is disposed on the optical path of the light beam traveling from the light source device to the optical modulator to detect the light beam or an arrangement in which the brightness of the projection image projected on the screen is detected.

In addition, even when the light source lamp for generating a light beam by an electric discharge is employed as the light source device, since the light beam in the nonvisible light region (for example, the infrared region) of the light beam irradiated by the light source device can be guided out of the optical path of the light beam traveling from the light source device to the optical modulator by the nonvisible light eliminator, the optical components such as the optical modulator can be prevented form being irradiated by the light beam in the nonvisible light region and properties of the optical components can be maintained good. In other words, high image quality of the projection image can be ensured.

A projector according to an aspect of the invention may preferably include a diaphragm control device that controls the optical diaphragm based on the light-receiving signal from the nonvisible light detector and locates the light shield at a predetermined position.

According to the aforesaid aspect, the projector can control the optical diaphragm as described below since the projector is provided with the diaphragm control device.

The diaphragm control device obtains or generates information on the opening ratio of the optical diaphragm (hereinafter, referred to as a first opening ratio) for setting the projection image to be projected in an enlarged manner to a predetermined brightness. The diaphragm control device generates information on the current opening ratio of the optical diaphragm (the second opening ratio) based on the light-receiving signal output by the nonvisible light detector and the predetermined relationship. The diaphragm control device controls the optical diaphragm to match the current second opening ratio with the first opening ratio.

Thus, the light shields can be positioned at desired positions (the first opening ratio) by the control of the diaphragm control device, that is, the projection image can be changed to have the desired brightness, thereby enhancing the image quality of the projection image.

With a projector according to an aspect of the invention, the exterior casing may preferably include a nonvisible light transmitting section for transmitting the light beam in the nonvisible light region and exhaust at least a part of the light beam in the nonvisible light region which is guided out of the optical path by the nonvisible light eliminator to the outside of the exterior casing.

The nonvisible light transmitting section may have any arrangement as long as the light beam in the nonvisible light region can be transmitted therethrough. For example, an opening may be formed in the exterior casing and a member for transmitting nonvisible light such as a glass material may be attached in the opening, or the opening may be used as the nonvisible light transmitting section without the member for transmitting the nonvisible light attached.

According to the aforesaid aspect, since the nonvisible light transmitting section is provided in the exterior casing, at least a part of the light beam in the nonvisible light region which is guided out of the optical path by the nonvisible light eliminator can be exhausted out of the exterior casing through the nonvisible light transmitting section. Hence, heat does not stay in the exterior casing, so that a rise in temperature in the exterior casing can be avoided as compared with, for example, an arrangement in which an absorber is provided to absorb the light beam in the nonvisible light region which is guided out of the optical path. With such arrangement, cooling devices for cooling the inside of the exterior casing such as a cooling fan can be largely omitted, thereby simplifying the arrangement of the projector and reducing the weight thereof.

A projector according to an aspect of the invention may preferably be provided with a light guide for guiding the light beam in the nonvisible light region which is guided out of the optical path by the nonvisible light eliminator to the nonvisible light transmitting section.

According to the aforesaid aspect, since the projector is provided with the light guide, the light beam in the nonvisible light region which is guided out of the optical axis by the nonvisible light eliminator can be guided to a predetermined position, the nonvisible light transmitting section in the exterior casing may not be provided adjacent to the nonvisible light eliminator, thereby enhancing the flexibility in manufacturing of the exterior casing. In addition, when a condenser lens for converging the light beam in the nonvisible light region is employed as the light guide, the nonvisible light transmitting section may not be large, thereby enhancing the appearance of the exterior casing.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the attached drawings.

Arrangement of Projector

Figure 1:
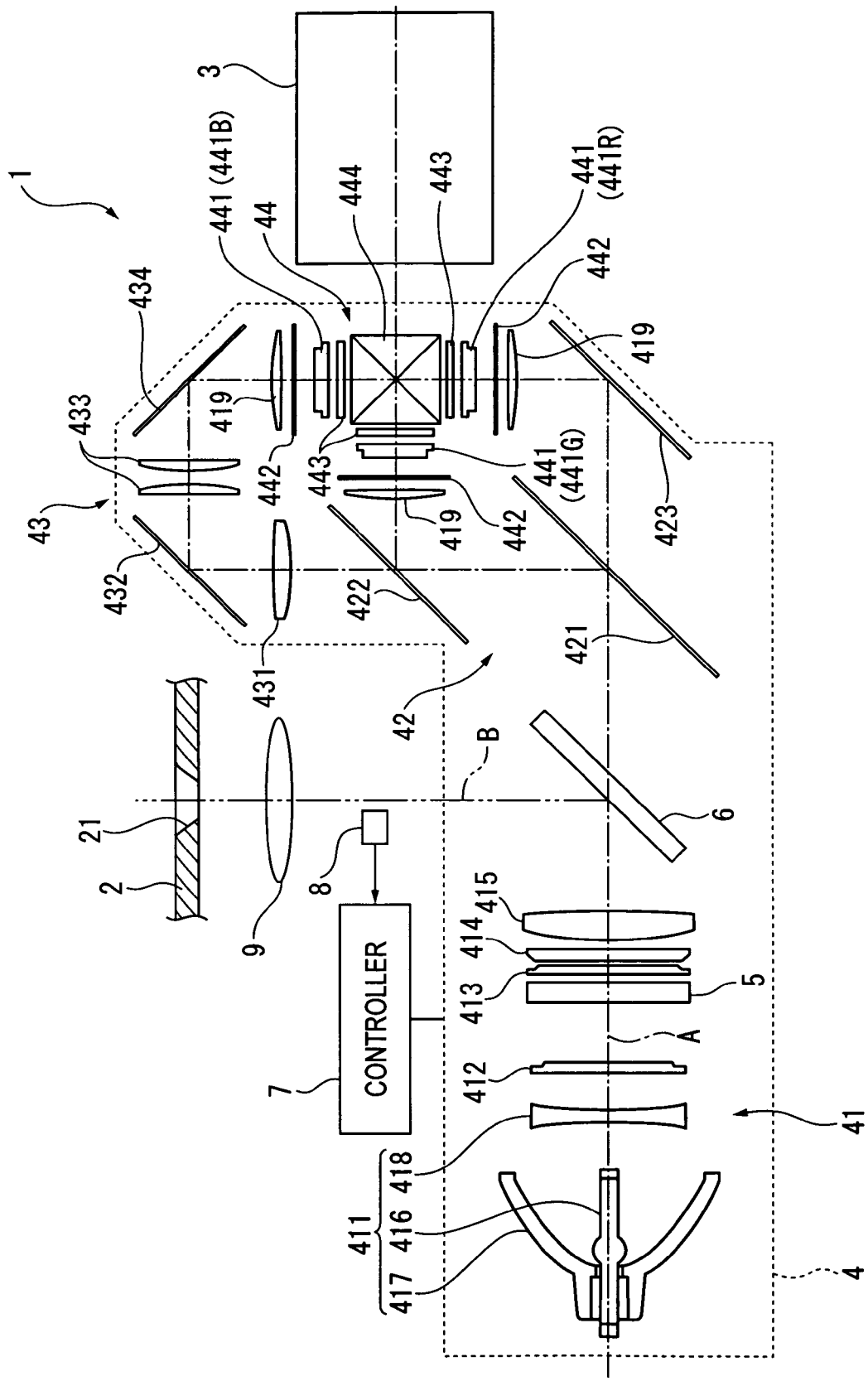
FIG. 1 is a schematic illustration briefly showing an arrangement of a projector of a first exemplary embodiment.

FIG. 1 is a schematic illustration briefly showing an arrangement of a projector 1.

The projector 1 modulates a light beam irradiated by a light source in accordance with image information to form an optical image and projects the formed optical image on a screen (not shown) in an enlarged manner. As shown in FIG. 1, the projector 1 includes: an exterior casing 2; a projection lens 3 as a projection optical device; an optical unit 4; an optical diaphragm 5; a nonvisible light reflection filter 6 as a nonvisible light eliminator; a controller 7 as a diaphragm control device; an optical sensor 8 as a nonvisible light detector; and a condenser lens 9 as a light guide.

Arrangement of Exterior Casing

The exterior casing 2 (not shown in FIG. 1) is formed with, for example, synthetic resin, the casing 2 being for containing the projection lens 3, the optical unit 4, the optical diaphragm 5, the nonvisible light reflection filter 6, the controller 7, the optical sensor 8 and the condenser lens 9.

As shown in FIG. 1, a nonvisible light transmitting section 21 through which the light beam in the nonvisible light region can be transmitted is provided in the vicinity of the nonvisible light reflection filter 6 in the exterior casing 2. The nonvisible light transmitting section 21 may be provided in any arrangement as long as the light beam in the nonvisible light region can be transmitted therethrough. For example, an opening may be formed in the exterior casing 2 and a glass material may be attached in the opening, or the opening may be used as the nonvisible light transmitting section 21 without the glass material attached.

Note that the material of the exterior casing 2 is not limited to the synthetic resin and other materials including high heat-conductive members such as metals may be used.

Arrangement of Projection Lens

The projection lens 3 projects the optical image (color image) formed by the optical unit 4 on the screen (not shown) in an enlarged manner. The projection lens 3 includes a lens set of a plurality of lenses housed in a cylindrical lens barrel.

Arrangement of Optical Unit

The optical unit 4 optically processes the light beam irradiated by the light source to form the optical image (color image) corresponding to the image information under the control of the controller 7. As shown in FIG. 1, the optical unit 4 includes an illumination optical device 41, a color-separating optical device 42, a relay optical device 43 and an optical device 44. Although not shown in detail in the figures, the illumination optical device 41, the color-separating optical device 42, the relay optical device 43, the optical device 44, the optical diaphragm 5, and the nonvisible light reflection filter 6 are housed in an optical component casing as one unit. Another nonvisible light transmitting section same as the nonvisible light transmitting section 21 in the exterior casing 2 is formed in the vicinity of the nonvisible light reflection filter 6 in the optical component casing. Through the nonvisible light transmitting section, the light beam in the nonvisible light region which is reflected by the nonvisible light reflection filter 6 is exhausted out of the optical component casing.

The illumination optical device 41 is an optical system for substantially uniformly illuminating an image formation area of a below-described liquid crystal panel of the optical device 44. As shown in FIG. 1, the illumination optical device 41 includes a light source device 411, a first lens array 412, a second lens array 413, a polarization converter 414 and a superposing lens 415.

As shown in FIG. 1, the light source device 411 includes a light source lamp 416 for irradiating a radial light beam, a reflector 417 for reflecting the radial light beam irradiated by the light source lamp 416 to converge it to a predetermined position, and a parallelizing concave lens 418 for parallelizing the light beam converged by the reflector 417 relative to an illumination optical axis A. As the light source lamp 416, light source lamps for generating a light beam by an electric discharge such as halogen lamps, metal halide lamps and high-pressure mercury lamps are often used. Note that the reflector 417 is herein an ellipsoidal reflector having a rotary ellipsoidal surface but may be a parabolic reflector having a rotary parabolic surface. When being the parabolic reflector, the reflector 417 is not provided with the parallelizing concave lens 418.

The first lens array 412 includes small lenses arranged in a matrix form, the lenses each having a substantially rectangular shape when viewed in an optical axis direction. The respective small lenses separate the light beam irradiated by the light source device 411 into a plurality of sub-beams.

The second lens array 413 has the substantially same arrangement as the first lens array 412 to include small lenses in a matrix form. Together with the superposing lens 415, the second lens array 413 focuses an image of the small lens of the first lens array 412 onto the image formation area of the below-described liquid crystal panel of the optical device 44.

The polarization converter 414 is disposed between the second lens array 413 and the superposing lens 415 and converts lights from the second lens array 413 into substantially uniform-type polarized lights.

Specifically, the respective sub-beams converted into the substantially uniform-type polarized lights by the polarization converter 414 are substantially superposed on the image formation area of the below-described liquid crystal panel of the optical device 44 by the superposing lens 415. For a projector employing liquid crystal panels for modulating polarized lights, only uniform-type of polarized lights can be utilized, so that approximately half of the lights from the light source device 411 emitting random polarized lights are not used. Accordingly, with the use of the polarization converter 414, the lights irradiated by the light source device 411 are converted into the substantially uniform-type polarized lights to enhance light utilization efficiency of the optical device 44.

As shown in FIG. 1, the color-separating optical device 42 includes a reflection mirror 423 and two dichroic mirrors 421, 422 which separate the plurality of sub-beams irradiated from the illumination optical device 41 into three color lights of red, green and blue.

The relay optical device 43 includes an incident-side lens 431, a relay lens 433 and reflection mirrors 432 and 434 and guides the color lights separated by the color-separating optical device 42 to the liquid crystal panel for blue lights.

Blue and green light components of the light beam irradiated from the illumination optical device 41 are reflected by the dichroic mirror 421 of the color-separating optical device 42 and a red light component thereof is transmitted through the dichroic mirror 421. The red light that has passed through the dichroic mirror 421 is reflected by the reflection mirror 423 and passes through the field lens 419 to reach the liquid crystal panel for red lights. The field lens 419 converts the respective sub-beams irradiated from the second lens array 413 into light beams parallel to the central axis (main beam) thereof. The field lenses 419 provided on the light-incident side of the liquid crystal panels for green and blue lights function in the same manner.

The green light out of the blue and green lights reflected by the dichroic mirror 421 is reflected by the dichroic mirror 422 and transmitted through the field lens 419 to reach the liquid crystal panel for green lights. The blue light passes through the dichroic mirror 422, the relay optical device 43 and the field lens 419 to reach the liquid crystal panel for blue lights. Note that the relay optical device 43 is used for the blue light in order to avoid deterioration in the light utilization efficiency due to light dispersion and the like caused by that the optical path of the blue light is longer than those of the other color lights. In other words, the relay optical device 43 is used for directly transmitting the sub-beams incident on the incident-side lens 431 to the field lens 419. Note that although the relay optical device 43 is herein arranged to transmit the blue light of the three color lights, but may be arranged such that the red light is transmitted therethrough, for example.

The optical device 44 includes three liquid crystal panels 441 (liquid crystal panel for red lights 441R, liquid crystal panel for green lights 441G, liquid crystal panel for blue lights 441B) as an optical modulator, three incident-side polarization plates 442, three irradiation-side polarization plates 443 and a cross dichroic prism 444.

As shown in FIG. 1, the three incident-side polarization plates 442 are disposed on the downstream of the respective field lenses 419 on the optical paths. On the incident-side polarization plates 442, the color lights with their polarization directions aligned in a substantially uniform direction by the polarization converter 414 are incident. The incident-side polarization plates 442 only transmit the polarized lights substantially in the direction same as the polarization axis of the light beams aligned by the polarization converter 414 and absorb the other incident light beams. Although not shown in the figures, the incident-side polarization plate 442 has a light-transmissive substrate made of sapphire glass, crystal or the like with a polarization film attached on the substrate.

As shown in FIG. 1, the three liquid crystal panels 441 are disposed on the downstream of the respective incident-side polarization plates 442 on the optical paths. Although not shown in the figures, the liquid crystal panel 441 includes a pair of transparent glass substrates with a liquid crystal (electrooptic material) sealed therebetween and controls orientation of the above-described liquid crystal at a predetermined pixel position in accordance with a drive signal output from the controller 7 to modulate the polarization direction of the polarized light beam irradiated from the incident-side polarization plate 422.

As shown in FIG. 1, the three irradiation-side polarization plates 443 are disposed on the downstream of the respective liquid crystal panels 441 on the optical paths. Although not shown in the figures, the irradiation-side polarization plate 443 has the substantially same arrangement as the incident-side polarization plate 442 and has a light-transmissive substrate with a polarization film attached thereon. Note that the polarization film of the irradiation-side polarization plate 443 is arranged such that a transmission axis of the light beam is substantially orthogonal to a transmission axis of the light beam in the incident-side polarization plate 442.

The cross dichroic prism 444 is an optical element for combining the optical images modulated for each color light irradiated by the irradiation-side polarization plate 443 to form a color image, the cross dichroic prism 444 being disposed on the downstream of the irradiation-side polarization plate 443 on the optical path. The cross dichroic prism 444 has a substantially square profile in plan view formed by adhering four right-angle prisms. Dielectric multi-layer films are formed on boundaries adhering the right-angle prisms. The dielectric multi-layer films reflect the color lights irradiated from the liquid crystal panels 441R and 441B and transmitted through the irradiation-side polarization plates 443, and the dielectric multi-layer films transmit the color light irradiated from the liquid crystal panel 441G and transmitted through the irradiation-side polarization plate 443. Thus, the color lights modulated by the liquid crystal panels 441 are combined to form the color image.

Arrangement of Optical Diaphragm

As shown in FIG. 1, the optical diaphragm 5 is disposed between the first lens array 412 and the second lens array 413. Under the control of the controller 7, the optical diaphragm 5 changes an opening area (opening ratio) for transmitting the light beam by moving a light shield to adjust light quantity of the light beam irradiated by the light source device 411 and transmitted through the first lens array 412.

Figure 2:
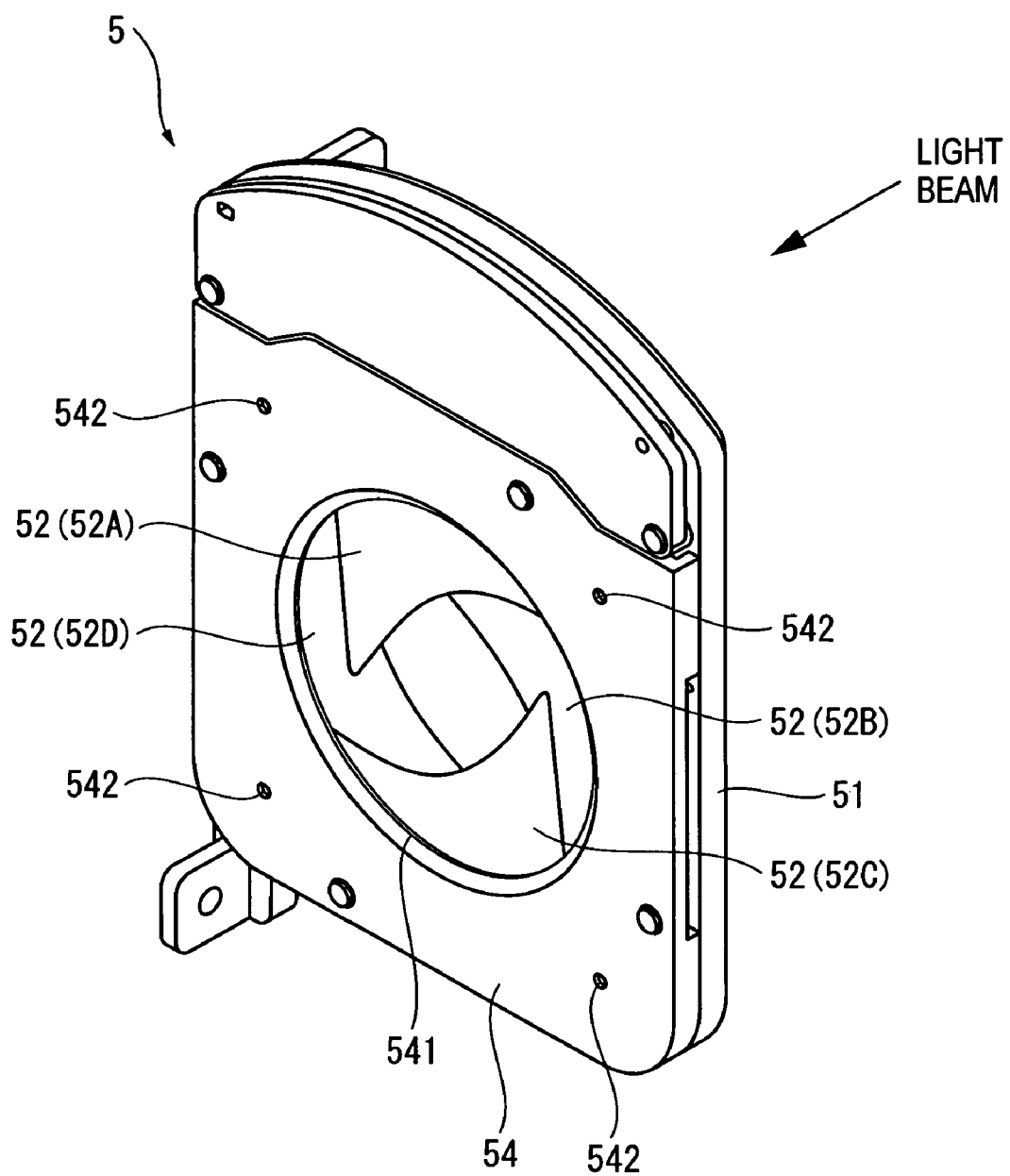
FIG. 2 is an illustration briefly showing an exemplary arrangement of an optical diaphragm of the first exemplary embodiment.
Figure 3:
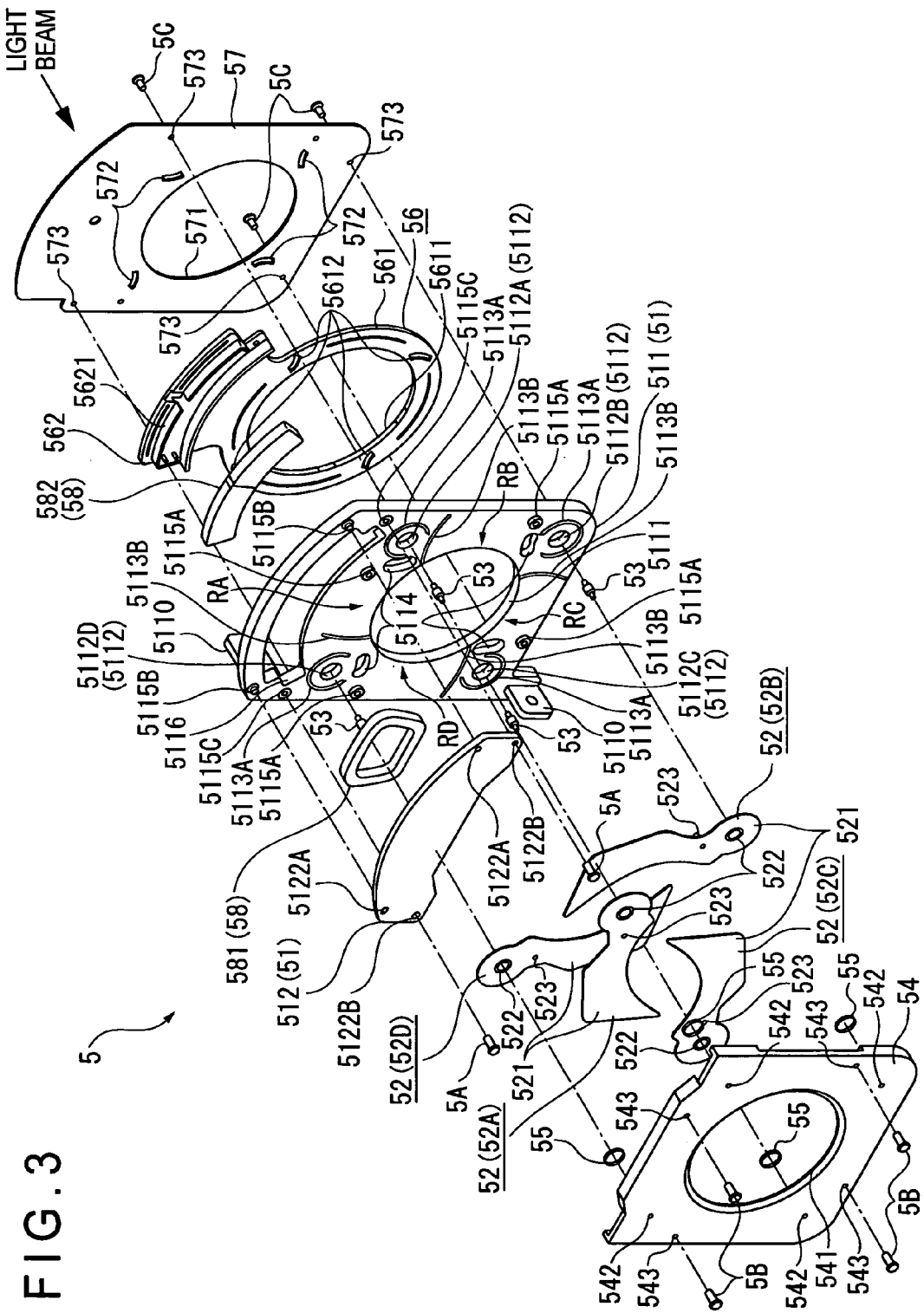
FIG. 3 is an illustration briefly showing another exemplary arrangement of the optical diaphragm of the first exemplary embodiment.

FIGS. 2 and 3 are illustrations briefly showing exemplary arrangements of the optical diaphragm 5. Specifically, FIG. 2 is a perspective view of the optical diaphragm 5 when seen from the light-irradiation side (the second lens array 413 side). FIG. 3 is an exploded perspective view of the optical diaphragm 5 when seen from the light-irradiation side (the second lens array 413 side).

As shown in FIGS. 2 and 3, the optical diaphragm 5 includes a base plate 51, four light shielding vanes 52 as the light shield, four rotary shafts 53 (FIG. 3), a vane holder 54, four coil springs 55 (FIG. 3), a diaphragm ring 56 (FIG. 3), a ring holder 57 (FIG. 3) and a electromagnetic actuator 58 (FIG. 3).

The base plate 51 supports the overall optical diaphragm 5 and fixes the optical diaphragm 5 in the optical component casing. As shown in FIG. 3, the base plate 51 includes a base plate main body 511 and a fixing member connecting portion 512.

Figure 4:
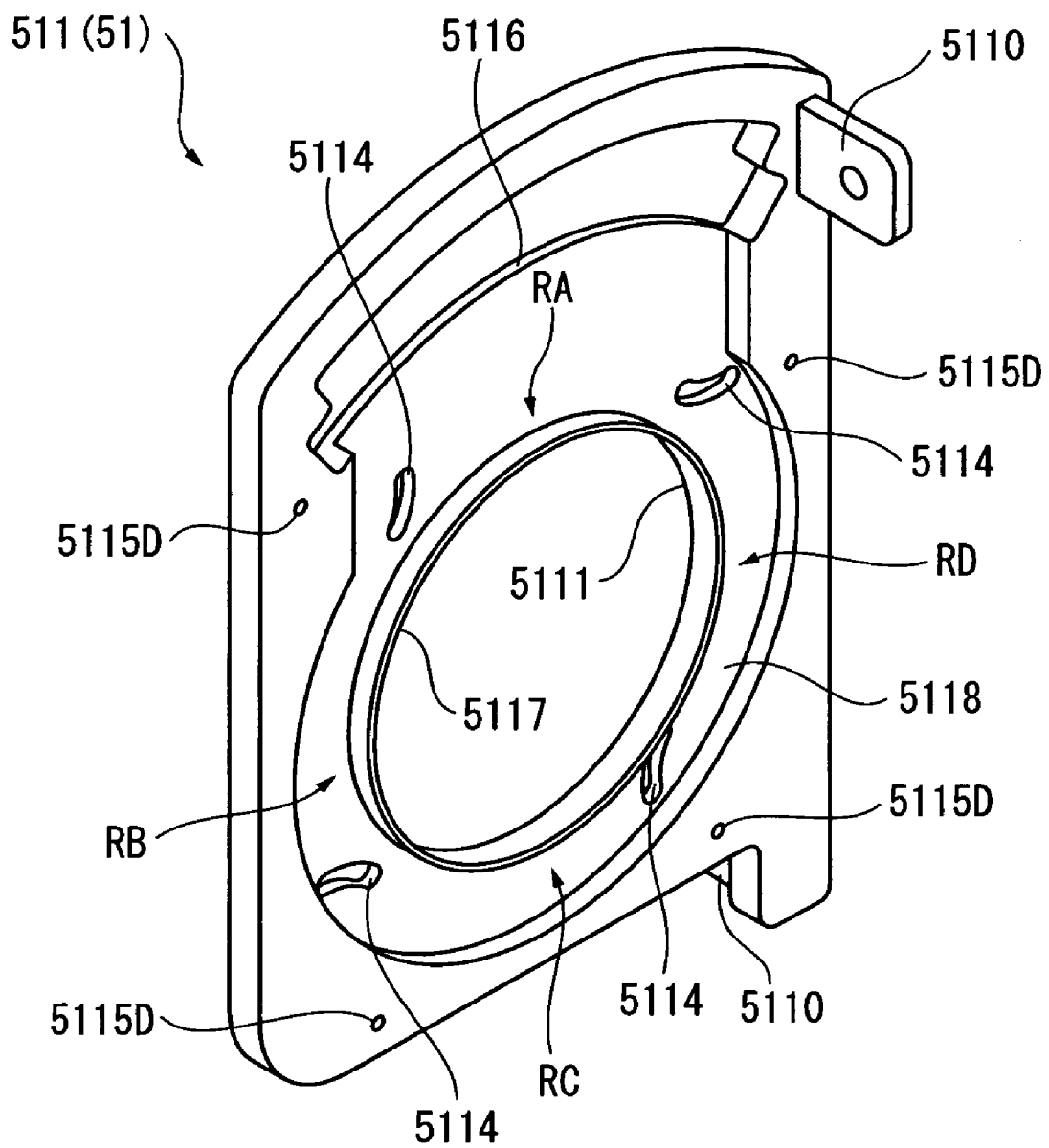
FIG. 4 is a perspective view of a base plate main body when seen from a light-incident side of the first exemplary embodiment.

FIG. 4 is a perspective view of the base plate main body 511 when seen from the light-incident side (the first lens array 412 side).

As shown in FIGS. 2 and 4, the base plate main body 511 is a metal plate having a substantially rectangular shape in plan view and extending along a plane orthogonal to the optical axis of the incident light beam.

As shown in FIGS. 3 and 4, the base plate main body 511 has an opening 5111 substantially at the center thereof in plan view, the opening 5111 being circular in plan view and transmitting the light beam irradiated from the first lens array 412.

As shown in FIG. 3, provided in the light-irradiation surface of the base plate main body 511 are recesses 5112 each being circular in plan view. The recesses 5112 are formed in the vicinity of the respective four corners of the base plate 51 (5112A, 5112B, 5112C and 5112D from the upper right corner in clockwise direction when viewed from the light-irradiation side). The recesses 5112 fix respective ends of the four rotary shafts 53 and hold below-described bearings of the four light shielding vanes 52 in a loosely fitted manner.

Hereinbelow, in the base plate main body 511, a peripheral area around the opening 511 is divided into following regions for easy understanding as shown in FIGS. 3 and 4: a first region RA including the recess 5112A on the upper side; a second region RB including the recess 5112B on the right side when seen from the light-irradiation side; a third region RC including the recess 5112C on the bottom side; and a fourth region RD including the recess 5112D on the left side when seen from the light-irradiation side.

As shown in FIG. 3, first projected treads 5113A are provided in the respective regions RA to RD on the light-irradiation surface of the base plate main body 511. Each first projected tread 5113A is formed in a circular shape in plan view in the vicinity of the respective recesses 5112 with the recess 5112 (the rotary shaft 53) as the center so as to enclose the recesses 5112. The first projected treads 5113A respectively abut on below-described plate surfaces of vane plates of the light shielding vanes 52, when the optical diaphragm 5 is assembled.

Although not shown in detail in the figures, the first projected treads 5113A in the regions RA and RC at diagonal positions of the first projected treads 5113A are set to have a uniform height. Similarly, the heights of the first projected treads 5113A in the regions RB and RD at diagonal positions are set to be uniform. The height of the first projected treads 5113A in the regions RB and RD is set to be larger by a predetermined size than the height of the first projected treads 5113A in the regions RA and RC.

As shown in FIG. 3, second projected treads 5113B are provided in the respective regions RA to RD on the light-irradiation surface of the base plate main body 511. Each second projected tread 5113B is formed in an arc shape in plan view around the recess 5112 (the rotary shaft 53) at a position apart from the respective recesses 5112. Similarly to the above-described first projected treads 5113A, the second projected treads 5113B respectively abut on the below-described plate surfaces of the vane plates of the light shielding vanes 52, when the optical diaphragm 5 is assembled. Note that the heights of the second projected treads 5113B are set in the same manner as the above-described first projected treads 5113A.

As shown in FIGS. 3 and 4, track holes 5114 are provided in the respective regions RA to RD in the vicinity of the respective recesses 5112 so as to penetrate through the light-irradiation surface and the light-incident surface of the base plate main body 511. Each track hole 5114 is formed in an arc shape in plan view around the recess 5112 (the rotary shaft 53). When the optical diaphragm 5 is assembled, below-described pins of the light shielding vanes 52 are inserted in the track holes 5114, so that the track holes 5114 serve as relief holes to avoid a mechanical interference of the pins when the pins are moved.

As shown in FIG. 3, attachment holes 5115A for attaching the vane holders 54 are provided in the regions RA to RD on the light-irradiation surface of the base plate main body 511. Each attachment hole 5115A is formed at a position so as not to mechanically interfere with the light shielding vanes 52 even when the light shielding vanes 52 are set to the base plate main body 511 and rotated.

As shown in FIGS. 3 and 4, an arc opening 5116 (as a notch) in an arc shape in plan view is provided in an upper end of the base plate main body 511, the arc opening 5116 being around the central axis of the opening 511 (the optical axis of the incident light beam).

When the optical diaphragm 5 is assembled, a below-described movable member of the electromagnetic actuator 58 and a part of a below-described movable member connecting portion of the diaphragm ring 56 are inserted in the arc opening 5116, so that the arc opening 5116 serves as a relief hole to avoid a mechanical interference of the diaphragm ring 56 with the movable member and the part of the movable member connecting portion even when the diaphragm ring 56 is rotated.

As shown in FIG. 3, two positioning projections 5115B and two attachment holes 5115C which are for attaching the fixing member connecting portions 512 are provided in the vicinity of the arc opening 5116 on the light-irradiation surface.

As shown in FIG. 4, a ring supporter 5117 having a circular frame shape in plan view is formed at the periphery of the opening 5111 on the light-incident side of the base plate main body 511 so as to project toward the light-incident side. The ring supporter 5117 is a portion to be loosely fitted in a below-described circular hole of the diaphragm ring 56.

As shown in FIG. 4, a recess 5118 having a circular shape in plan view is provided around the ring supporter 5117. The upper side of the recess 5118 is formed so as to extend to the upper end of the base plate main body 511. When the diaphragm ring 56 is attached, the recess 5118 rotatably supports the diaphragm ring 56 such that the diaphragm ring 56 can rotate substantially around the central axis (the optical axis of the incident light beam) of the opening 511. The recess 5118 has a shape corresponding to the profile of the diaphragm ring 56.

As shown in FIG. 4, attachment holes 5115D for attaching the ring holder 57 are respectively provided in the regions RA to RD in the vicinity of the recess 5118 on the light-incident side of the base plate main body 511. Each attachment hole 5115D is formed at a position so as not to mechanically interfere with the diaphragm ring 56 even when the ring holder 57 is attached to the base plate main body 511 via the diaphragm ring 56 and the diaphragm ring 56 rotates.

On the bottom side of the light-irradiation surface and the upper side of the light-incident surface of the base plate main body 511, fixing members 5110 for fixing the base plate main body 511 in the optical component casing are provided so as to project in an out-of-plane direction of the base plate main body 511. Thus, the base plate main body 511 is fixed in the optical component casing via the fixing members 5110, so that the whole optical diaphragm 5 is fixed in the optical component casing.

The fixing member connecting portion 512 is a member for connecting a below-described fixing member of the electromagnetic actuator 58 to the base plate main body 511. As shown in FIG. 3, the fixing member connecting portion 512 is a plate having a substantially rectangular shape in plan view and attached to the light-irradiation surface of the base plate main body 511 so as to cover the arc opening 5116.

Although not shown in detail in the figures, provided on the light-irradiation surface of the fixing member connecting portion 512 is a recess having a substantially circular shape in plan view in correspondence to the shape of a magnet coil as the below-described fixing member of the electromagnetic actuator 58. The recess is a portion for housing the magnet coil.

As shown in FIG. 3, the fixing member connecting portion 512 is also provided with two positioning holes 5122A and two attachment holes 5122B at the four corners, the positioning holes 5122A and the attachment holes 5122B respectively corresponding to the two positioning projections 5115B and the two attachment holes 5115C of the base plate main body 511. With the magnet coil housed in the recess, the fixing member connecting portion 512 is positioned by fitting the two positioning holes 5122A onto the two positioning projections 5115B of the base plate main body 511 and is fixed to the base plate main body 511 by screwing fixing screws 5A which are inserted through the two attachment holes 5122B to engage with the two attachment holes 5115C of the base plate main body 511.

When the fixing member connecting portion 512 is fixed to the base plate main body 511, the magnet coil housed in the recess of the fixing member connecting portion 512 is disposed at an offset position on the light-irradiation side (apart from the diaphragm ring 56) of the base plate main body 511.

The four light shielding vanes 52 are metal members. As shown in FIG. 3, the light shielding vanes 52 are respectively supported via the four rotary shafts 53 in the recesses 5112 in the regions RA to RD on the light-irradiation surface of the base plate main body 511, the vanes 52 being supported rotatably along a plane orthogonal to the optical axis of the incident light beam. The light shielding vanes 52 rotate to change the opening area (the opening ratio) for transmitting the light beam, thereby adjusting the light quantity of the light beam irradiated from the first lens array 412. Note that the light shielding vanes 52 formed in the regions RA to RD are respectively given the reference numerals 52A to 52D in the description below.

The light shielding vanes 52 have a common shape. As shown in FIG. 3, the light shielding vane 52 includes a vane plate 521, a bearing 522 and a pin 523.

As shown in FIG. 3, the vane plate 521 has a substantially L-shape in plan view including a curved rim, the vane plate 521 being a metal plate for shielding the incident light beam. When the optical diaphragm 5 is assembled, an inner portion of the L-shape of the vane plate 521 is oriented toward the center of the opening 5111. The vane plates 521 are disposed so as to cover the opening 5111. When the optical diaphragm 5 is assembled, the vane plates 521 are also provided such that the plate surfaces thereof are orthogonal to the optical axis of the incident light beam.

The bearing 522 is integrally formed in an end of the L-shape of the vane plate 521 as a bearing for the rotary shaft 53 that rotates the vane plate 521.

Although not shown in detail in the figures, the bearing 522 has a substantially cylindrical shape projecting from the light-incident surface toward the light-incident side of the vane plate 521. The rotary shaft 53 can be inserted through the bearing 522. In other words, the thickness of the bearing 522 in the optical axis direction of the light beam is larger than the thickness of the vane plate 521 in the optical axis direction of the light beam. The bearing 522 is rotatable relative to the rotary shaft 53 with the rotary shaft 53 inserted in the bearing 522. By rotating relative to the rotary shaft 53, the bearing 522 rotates the vane plate 521. Thus, the rotations of the vane plates 521 change the opening area of the opening for transmitting the light beam, the opening being defined by inner edges of the L-shapes of the vane plates 521.

When the optical diaphragm 5 is assembled, the rotary shaft 53 is inserted through the bearing 522 and the light-incident surface of the bearing 522 abuts on a bottom of the recess 5112 of the base plate main body 511.

The vane plate 521 is arranged to be substantially orthogonal to the bearing 522 and accordingly orthogonal to the rotary shaft 53 inserted through the bearing 522, when the optical diaphragm 5 is assembled. The vane plates 521 are substantially in parallel to the plate surface of the base plate main body 511, when the optical diaphragm 5 is assembled.

However, the vane plates 521 may not be substantially orthogonal to the respective bearings 522 but may be arranged so as to have any angle other than substantially a right angle relative to the bearing 522 as long as the vane plates 521 do not abut on each other when the light shielding vanes 52 rotate. Specifically, as long as the vane plates 521 do not abut on each other when the light shielding vanes 52 rotate, the vane plate 521 may be slant by a predetermined angle relative to a plane parallel to the plate surface of the base plate main body 511.

Although not shown in detail in the figures, heights from the bottoms of the recesses 5112 of the base plate main body 511 abutting on the bearings 522 are arranged to define a predetermined difference between the adjacent vane plates 521 when the optical diaphragm 5 is assembled, i.e., when the light-incident surfaces of the bearings 522 of the light shielding vanes 52 abut on the bottoms of the recesses 5112.

Specifically, the recesses 5112A, 5112C at diagonal positions out of the recesses 5112A to 5112D have a common height. Similarly, the recesses 5112B, 5112D at diagonal positions have a common height from the bottoms. The height of the recesses 5112A, 5112C from the bottoms thereof is set larger than that of the recesses 5112B, 5112D from the bottoms thereof by a predetermined length. By thus arranging, when the optical diaphragm 5 is assembled, i.e., when the light-incident surfaces of the bearings 522 of the light shielding vanes 52 respectively abut on the bottoms of the recesses 5112, the vane plates 521 of the light shielding vanes 52A to 52D are positioned so as to have different heights from the base plate main body 511.

Concretely, the vane plates 521 of the light shielding vanes 52 which are diagonal are positioned to have a common height from the base plate main body 511, and accordingly the vane plates 521 of the adjacent light shielding vanes 52 have different heights from each other from the base plate main body 511. This arrangement defines a gap of a predetermined size between the adjacent vane plates 521, thereby preventing mechanical interference between the vane plates 521 when the vane plates 521 are rotated.

The pin 523 is provided in the vicinity of the bearing 522 and on the other side of the vane plate 521 relative to the bearing 522. The pin 523 fits in the diaphragm ring 56 to receive a pressure from the diaphragm ring 56.

As shown in FIG. 3, the pin 523 projects from the light-incident surface of the vane plate 521 toward the light-incident side. As shown in FIG. 3, the pin 523 is inserted in and through the track hole 5114 of the base plate main body 511 to project out from the light-incident surface of the base plate main body 511 to fit into a below-described elongated hole of the diaphragm ring 56.

The four rotary shafts 53 are metal members each having a substantially cylindrical shape. The rotary shaft 53 is fixed between the base plate main body 511 and the vane holder 54 and supports the light shielding vane 52 in a rotatable manner.

As shown in FIG. 3, the vane holder 54 is a plate of synthetic resin. When combined with the fixing member connecting portion 512, the vane holder 54 has the substantially same profile as the base plate main body 511, i.e., the substantially rectangular shape in plan view. The vane holder 54 presses the light shielding vanes 52 to the base plate 51 in a rotatable manner.

As shown in FIGS. 2 and 3, the vane holder 54 has an opening 541 same as the opening 5111 of the base plate main body 511. The opening 541 is substantially at the center of the vane holder 54 in plan view and has a circular shape in plan view. The opening 541 transmits the light beam irradiated from the first lens array 412.

As shown in FIGS. 2 and 3, the vane holder 54 has axis fixing holes 542 defined at positions corresponding to the recesses 5112 of the base plate main body 511. The axis fixing holes 542 penetrate the light-irradiation surface and the light-incident surface of the vane holder 54 and fit with the other end of the rotary shaft 53 to fix the other end of the rotary shaft 53.

As shown in FIGS. 2 and 3, the vane holder 54 has attachment holes 543 penetrating the light-irradiation surface and the light-incident surface thereof, the attachment holes 543 being at positions corresponding to the attachment holes 5115A of the base plate main body 511. By inserting and screwing fixing screws 5B via the attachment holes 543 into the attachment holes 5115A, the vane holder 54 is fixed to the base plate main body 511 while pressing the light shielding vanes 52 to the base plate main body 511.

As shown in FIG. 3, the four coil springs 55 allow the respective rotary shafts 53 to penetrate therethrough. The coil springs 55 are disposed between the light shielding vanes 52 and the vane holder 54 with the other ends of the rotary shafts 53 inserted therein. One end of the coil spring 55 abuts on the light shielding vane 52 on the light-irradiation side (in the vicinity of the bearing 522) and the other end of the coil spring 55 abuts on the vane holder 54 on the light-incident surface (around the periphery of the axis fixing hole 542). When the vane holder 54 is attached relative to the base plate main body 511, the coil springs 55 bias the respective light shielding vanes 52 toward the base plate main body 511 such that the bearings 522 of the light shielding vanes 52 abut on the bottom of the recess 5112 of the base plate main body 511.

The diaphragm ring 56 is rotatably set in the recess 5118 of the base plate main body 511. In this state, the diaphragm ring 56 engages with the pins 523 of the light shielding vanes 52 and rotates to press the pins 523, thereby rotating the vane plates 521 of the light shielding vanes 52 around the rotary shafts 53. The diaphragm ring 56 is made of synthetic resin. As shown in FIG. 3, a ring main body 561 as a vane rotating plate main body and the movable member connecting portion 562 integrally form the diaphragm ring 56.

The ring main body 561 is a plate body in a circular frame shape in plan view, the ring main body 561 having a circular hole 5611 for allowing the ring supporter 5117 of the base plate main body 511 to be inserted.

As shown in FIG. 3, elongated holes 5612 are defined in the ring main body 561 at positions corresponding to the respective track holes 5114 of the base plate main body 511 so as to allow the pins 523 projecting from the track holes 5114 to penetrate, the elongated holes 5612 extending substantially linearly in a direction intersecting the circumferential direction substantially around the central axis of the opening 5111.

As shown in FIG. 3, the movable member connecting portion 562 extends along the plate surface of the ring main body 561 from the outer circumference of the ring main body 561 to connect the below-described movable member of the electromagnetic actuator 58 to the ring main body 561. As shown in FIG. 3, when the optical diaphragm 5 is assembled, the movable member connecting portion 562 is disposed so as to face the upper end of the base plate main body 511.

As shown in FIG. 3, the movable member connecting portion 562 is formed in a shape corresponding to the shape of the arc opening 5116 of the base plate main body 511 and is provided with a projecting portion 5621 in a substantially rectangular shape in plan view which projects toward the light-irradiation side. The projection portion 5621 is a portion for housing a below-described permanent magnet (the movable member) of the electromagnetic actuator 58. When the optical diaphragm 5 is assembled, the permanent magnet housed in the projecting portion 5621 and the part of the projecting portion 5621 are inserted in the arc opening 5116 of the base plate main body 511.

Note that the length in the rotational direction of the diaphragm ring 56 of the projecting portion 5621 (the rotational direction around the optical axis of the incident light beam) is set to be smaller than the length in the same direction of the arc opening 5116 of the base plate main body 511. Hence, even when the diaphragm ring 56 is rotated, the arc opening 5116 and the projection portion 5621 do not mechanically interfere with each other.

Since the elongated holes 5612 of the ring main body 561 is formed so as to extend substantially linearly in a direction intersecting the peripheral direction substantially around the central axis of the opening 5111, when the optical diaphragm 5 is assembled and the diaphragm ring 56 is rotated, the pins 523 of the light shielding vanes 52 are pressed by edges of the elongated holes 5612 such that the pins 523 are moved along the elongated holes 5612. When being moved along the elongated holes 5612, the pins 523 move in a rotational manner around the respective recesses 5112 (the rotary shafts 53) of the base plate 51 without mechanically interfering with the track holes 5114 of the base plate 51. In accordance with the movement of the pins 523, the vane plates 521 of the light shielding vanes 52 rotate around the respective rotary shafts 53.

As shown in FIG. 3, the ring holder 57 is a metal plate having a substantially rectangular profile in plan view, the shape being substantially the same as that of the base plate main body 511. The ring holder 57 is for rotatably pressing the diaphragm ring 56 to the base plate 51.

As shown in FIG. 3, the ring holder 57 has an opening 571 same as the opening 5111 of the base plate main body 511. The opening 571 having a substantially circular shape is substantially at the center of the ring holder 57 in plan view and transmits the light beam irradiated from the first lens array 412.

As shown in FIG. 3, the ring holder 57 has track holes 572 that are the same as the track holes 5114 of the base plate main body 511, the track holes 572 being at positions corresponding to the track holes 5114. Similarly to the track holes 5114, when the optical diaphragm 5 is assembled, the pins 523 of the light shielding vanes 52 are inserted in the track holes 572, so that the track holes 572 serve as a relief hole to avoid a mechanical interference with the pins 532 when the pins 532 are moved.

As shown in FIG. 3, the ring holder 57 has attachment holes 573 penetrating the light-irradiation surface and the light-incident surface thereof, the attachment holes 573 being at positions corresponding to the attachment holes 511 SD of the base plate main body 511. By inserting and screwing fixing screws 5C via the attachment holes 573 into the attachment holes 511 SD, the ring holder 57 is fixed to the base plate main body 511 while pressing the diaphragm ring 56 to the base plate main body 511.

Figure 5A:
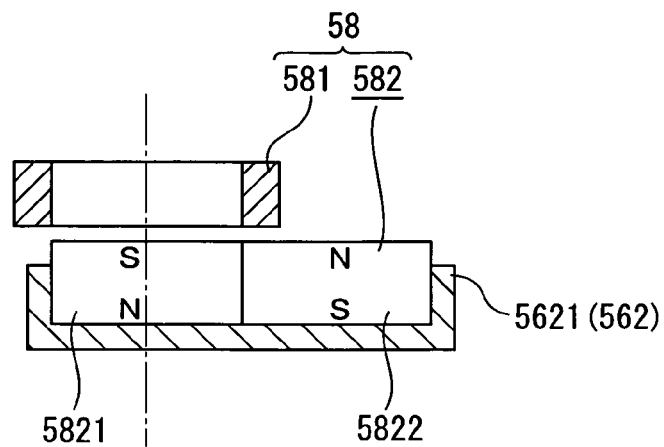
FIG. 5 is a schematic illustration showing an arrangement of an electromagnetic actuator of the first exemplary embodiment.
Figure 5B:
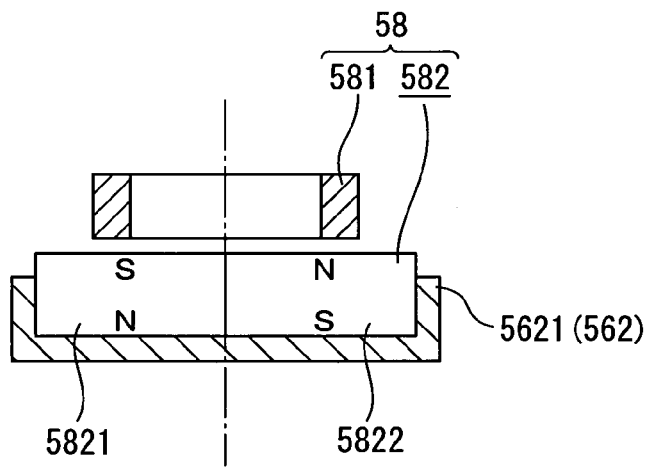
Figure 5C:
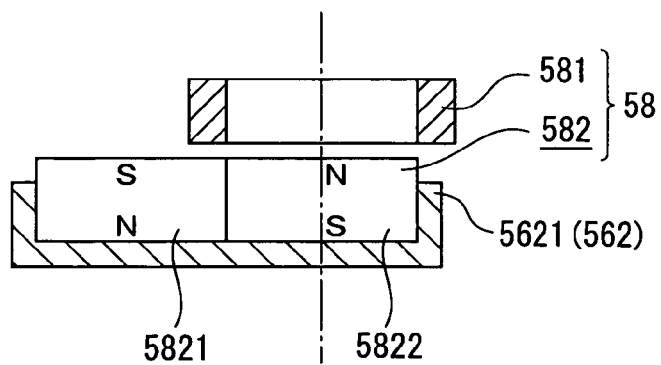

FIG. 5 is a schematic illustration showing an arrangement of the electromagnetic actuator 58.

As shown in FIGS. 3 and 5, the electromagnetic actuator 58 includes a magnet coil 581 as the fixing member; and a permanent magnet 582 as the movable member. Under the control of the controller 7, the electromagnetic actuator 58 converts electrical energy to mechanical energy to move the permanent magnet 582 toward the magnet coil 581, thereby rotating the diaphragm ring 56.

As shown in FIG. 3, the magnet coil 581 is formed in a ring shape and housed in the recess of the fixing member connecting portion 512 such that the axis of the magnet coil 581 is substantially parallel to the optical axis of the incident light beam.

As shown in FIGS. 3 and 5, the permanent magnet 582 integrally includes a first magnet 5821 (FIG. 5) and a second magnet (FIG. 5) and is fittingly fixed in the recess 5621 of the movable member connecting portion 562 of the diaphragm ring 56.

As shown in FIG. 5, the first magnet 5821 is fittingly fixed in the recess 5621 such that north pole thereof is on the movable member connecting portion 562 side and south pole thereof is on the opposite side apart from the movable member connecting portion 562 (on the side facing the magnet coil 581).

As shown in FIG. 5, the second magnet 5822 is fittingly fixed in the recess 5621 such that, in contrast with the first magnet 5821, south pole of the second magnet 5822 is on the movable member connecting portion 562 side and north pole thereof is on the opposite side apart from the movable member connecting portion 562 (on the side facing the magnet coil 581).

Arrangement of Nonvisible Light Reflection Filter

Figure 6:
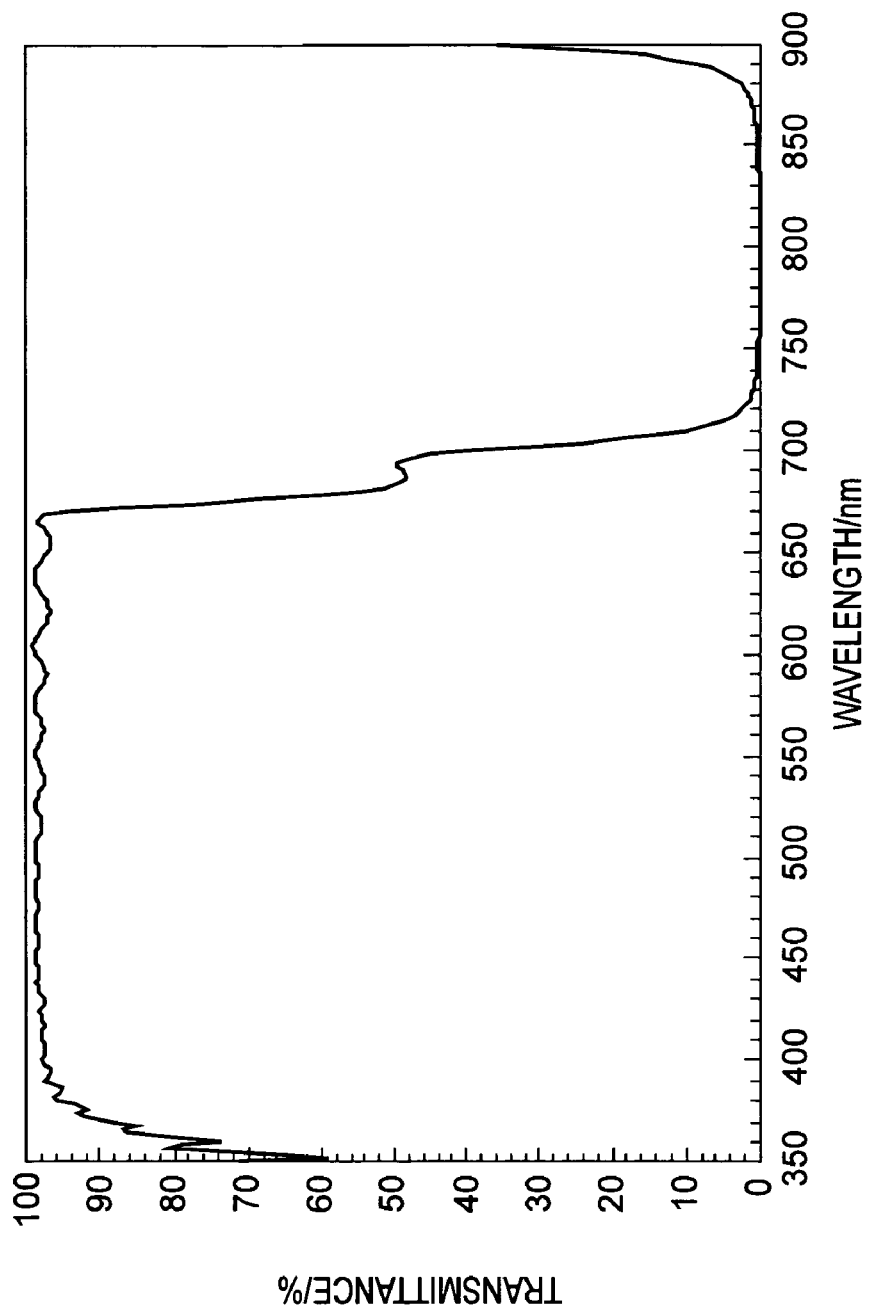
FIG. 6 is a graph showing an exemplary wavelength and transmittance of a nonvisible light reflection filter of the first exemplary embodiment.

FIG. 6 is an exemplary graph showing wavelength and transmittance of a nonvisible light reflection filter 6.

As shown in FIG. 1, the nonvisible light reflection filter 6 is disposed on the downstream side the superposing lens 415 on the optical path (on the downstream side of the optical diaphragm 5 on the optical path) so as to be slant at a predetermined angle relative to the illumination optical axis A (for example, at 45 degrees). As shown in FIG. 6, the nonvisible light reflection filter 6 is a so-called hot mirror that reflects a predetermined spectrum component of the incident light beam (nonvisible light region: in an example shown in FIG. 6, less than about 400 nm and more than about 650 nm) and transmits the other spectrum component (visible light region: in the example shown in FIG. 6, about 400 to 650 nm). Although not shown in detail in the figures, the nonvisible light reflection filter 6 includes a glass substrate such as a blue glass sheet and a white glass sheet; and an optical conversion film in which thin layers of different refractive indexes, that is, high refractive layers and low refractive layers are alternately deposited on a surface of the glass substrate.

As shown in FIG. 1, the nonvisible light reflection filter 6 reflects the light beam in the nonvisible light region to guide it out of the optical path of the illumination optical axis A such that the light beam travels along an optical axis B, the light beam to travel through the optical components 41 to 44 traveling on the illumination optical axis A. As shown in FIG. 1, the light beam in the visible light region that has passed through the nonvisible light reflection filter 6 travels along the illumination optical axis A.

Arrangement of Optical Sensor

Figure 7:
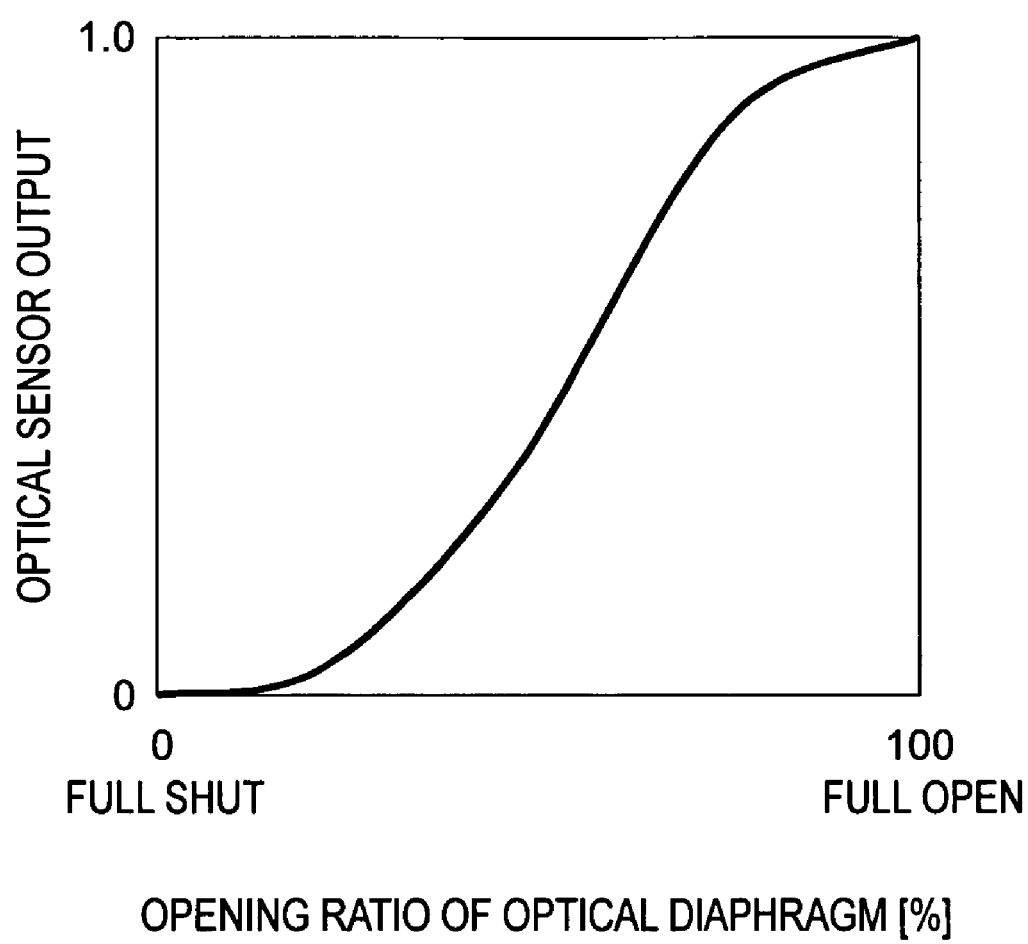
FIG. 7 is a graph showing an exemplary relationship between an output value of an optical sensor and an opening ratio of the optical diaphragm of the first exemplary embodiment.

FIG. 7 is an exemplary graph showing a relationship between output values of the optical sensor 8 and the opening ratio of the optical diaphragm 5.

As shown in FIG. 1, the optical sensor 8 is made with, for example, a photo diode and disposed around an irradiation position of the light beam in the nonvisible light region reflected by the nonvisible light reflection filter 6 to receive the light beam in the nonvisible light region. The optical sensor 8 outputs to the controller 7 a light-receiving signal in accordance with light quantity of the received light beam in the nonvisible light region. Since the optical sensor 8 is disposed on the downstream side of the optical diaphragm 5 on the optical path, the optical sensor 8 receives the light beam in the nonvisible light region contained in the light beam of which light quantity is adjusted by the optical diaphragm 5. Specifically, as shown in FIG. 7, since the light quantity of the light beam in the nonvisible light region that the optical sensor 8 receives has a relationship with the opening area of the optical diaphragm 5 which can transmit the light beam (i.e. the opening area (opening ratio) defined by the four light shielding vanes 52), the optical sensor 8 can detect the opening ratio of the optical diaphragm 5 by receiving the light beam in the nonvisible light region.

Arrangement of Controller

The controller 7 includes a computing circuit such as a CPU (Central Processing Unit) and controls the whole projector 1 in accordance with a predetermined program stored in a memory (not shown).

The controller 7 controls the liquid crystal panels 441 in an exemplary manner described below.

The controller 7 inputs image information (such as an image signal) output by various external devices, processes the input image signal in a predetermined manner and outputs a drive signal corresponding to the processed image to the liquid crystal panels 441, thereby forming a predetermined optical image. The predetermined processing may include a size adjustment processing such as zoom-in and zoom-out, a keystone distortion correction processing, an image quality adjustment and a gamma correction processing.

The controller 7 also controls the optical diaphragm 5 in an exemplary manner described below.

Specifically, the controller 7 analyzes the input image information to generate brightness information of an image corresponding to the image information. The brightness information may be information on a maximum luminance, a minimum luminance, or an average luminance of luminance values of each pixel of the image corresponding to the image information. The controller 7 identifies the opening ratio (hereinafter, referred to as a first opening ratio) of the optical diaphragm 5 that corresponds to the generated brightness information, the identification being conducted based on an LUT (Look-Up-Table) in which the brightness information and the first opening ratio of the optical diaphragm 5 are associated with each other. The controller 7 identifies a current opening ratio (hereinafter, referred to as a second opening ratio) of the optical diaphragm 5 which corresponds to the output value of the light-receiving signal output by the optical sensor 8, the identification being conducted based on, for example, the LUT having the relationship (shown in FIG. 7, for example) in which the output value of the light-receiving signal output by the optical sensor 8 and the opening ratio of the optical diaphragm 5 are associated with each other. The controller 7 calculates the difference between the identified first and second opening ratios to output a drive signal in accordance with the calculated difference, thereby matching the current opening ratio (second opening ratio) of the optical diaphragm 5 with the first opening ratio.

When the optical diaphragm 5 has an exemplary arrangement shown in FIGS. 2 to 5, the controller 7 positively or negatively energize the magnet coil 581 to change a direction of electromagnetic power formed by an interaction between the magnetic flux from the permanent magnet 582 and a current flowing in the magnet coil 581 (a current flowing in vertical portions of the magnet coil 581 in FIG. 3), the current flow being substantially orthogonal to the magnetic flux. The electromagnetic power moves the permanent magnet 582 to end positions shown in FIG. 5A and FIG. 5C and a neutral position shown in FIG. 5B. The diaphragm ring 56 is rotated in accordance with the movement of the permanent magnet 582, and the light shielding vanes 52 are rotated in conjunction with the rotation of the diaphragm ring 56. Accordingly, the current second opening ratio defined by the light shielding vanes 52 are matched with the first opening ratio.

Arrangement of Condenser Lens

As shown in FIG. 1, the condenser lens 9 condenses the light beam in the nonvisible light region which is reflected by the nonvisible light reflection filter 6 toward the nonvisible light transmitting section 21 of the exterior casing 2. In other words, the light beam in the nonvisible light region which is reflected by the nonvisible light reflection filter 6 is exhausted out of the projector 1 through the nonvisible light transmitting section 21.

According to the above-described first exemplary embodiment, since the optical sensor 8 is arranged to detect an unnecessary light component (the light beam in the nonvisible light region) of the light beam adjusted by the optical diaphragm 5, the unnecessary light component being guided out of the optical path of the illumination optical axis A by the nonvisible light reflection filter 6, the light quantity adjusted by the optical diaphragm 5, that is, the second opening ratio of the optical diaphragm 5 can be reliably detected even when the optical diaphragm 5 includes change over time or manufacturing errors in mechanism components for driving the plurality of light shielding vanes 52 (for example, the base plate 51, the diaphragm ring 56 and the electromagnetic actuator 58). Thus, the light shielding vanes 52 can be positioned at desired positions (the first opening ratio) by the control of the controller 7, that is, the projection image can be changed to have a desired brightness, thereby enhancing the image quality of the projection image.

In the arrangement in which the optical sensor 8 detects the unnecessary light component that has been guided out of the optical path of the illumination optical axis A, it can be avoided that the light beam is irradiated on the optical sensor 8 to form an unnecessary image in the image or it is not necessary that a member for detecting the luminance of the projection image is provided outside the projector 1. Hence, high image quality can be ensured with the enhanced flexibility in layout of the optical sensor 8 in the exterior casing 2 as compared with an arrangement in which the optical sensor 8 is disposed on the optical path of the light beam traveling from the light source device 411 to the liquid crystal panels 441 in order to detect the light beam or an arrangement in which the brightness of the projection image projected on the screen is detected.

Since the light beam in the nonvisible light region (for example, the infrared region) of the light beam irradiated by the light source device 411 can be guided out of the optical path of the illumination optical axis A by the nonvisible light reflection filter 6, the optical components including the liquid crystal panels 441 and the polarization plates 442, 443 can be prevented form being irradiated by the light beam in the nonvisible light region, properties of the optical components can be maintained good. In other words, high image quality of the projection image can be ensured.

Since the nonvisible light transmitting section 21 is provided in the exterior casing 2, the light beam in the nonvisible light region which is guided out of the optical path of the illumination optical axis A by the nonvisible light reflection filter 6 can be exhausted out of the exterior casing 2 through the nonvisible light transmitting section 21. Hence, heat does not stay in the exterior casing 2, so that a rise in temperature in the exterior casing 2 can be avoided as compared with, for example, an arrangement in which an absorber is provided to absorb the light beam in the nonvisible light region which is guided out of the optical path of the illumination optical axis A. With such arrangement employing the nonvisible light transmitting section 21, cooling devices for cooling the inside of the exterior casing 2 such as a cooling fan can be largely omitted, thereby simplifying the projector 1 and reducing the weight thereof.

Since the condenser lens 9 guides the light beam in the nonvisible light region which is guided out of the optical axis of the illumination optical axis A by the nonvisible light reflection filter 6 to a predetermined position, the nonvisible light transmitting section 21 in the exterior casing 2 may not be provided adjacent to the nonvisible light reflection filter 6, thereby enhancing the flexibility in manufacturing of the exterior casing 2. Since the condenser lens 9 converges the light beam in the nonvisible light region, the nonvisible light transmitting section 21 may not be large, thereby enhancing the appearance of the exterior casing 2.

Second Exemplary Embodiment

Next, a second exemplary embodiment of the invention will be described below with reference to the attached drawings.

In the description below, the same reference numerals will be attached to the structures and components which are the same as the first exemplary embodiment to omit or simplify the detailed description thereof.

Figure 8:
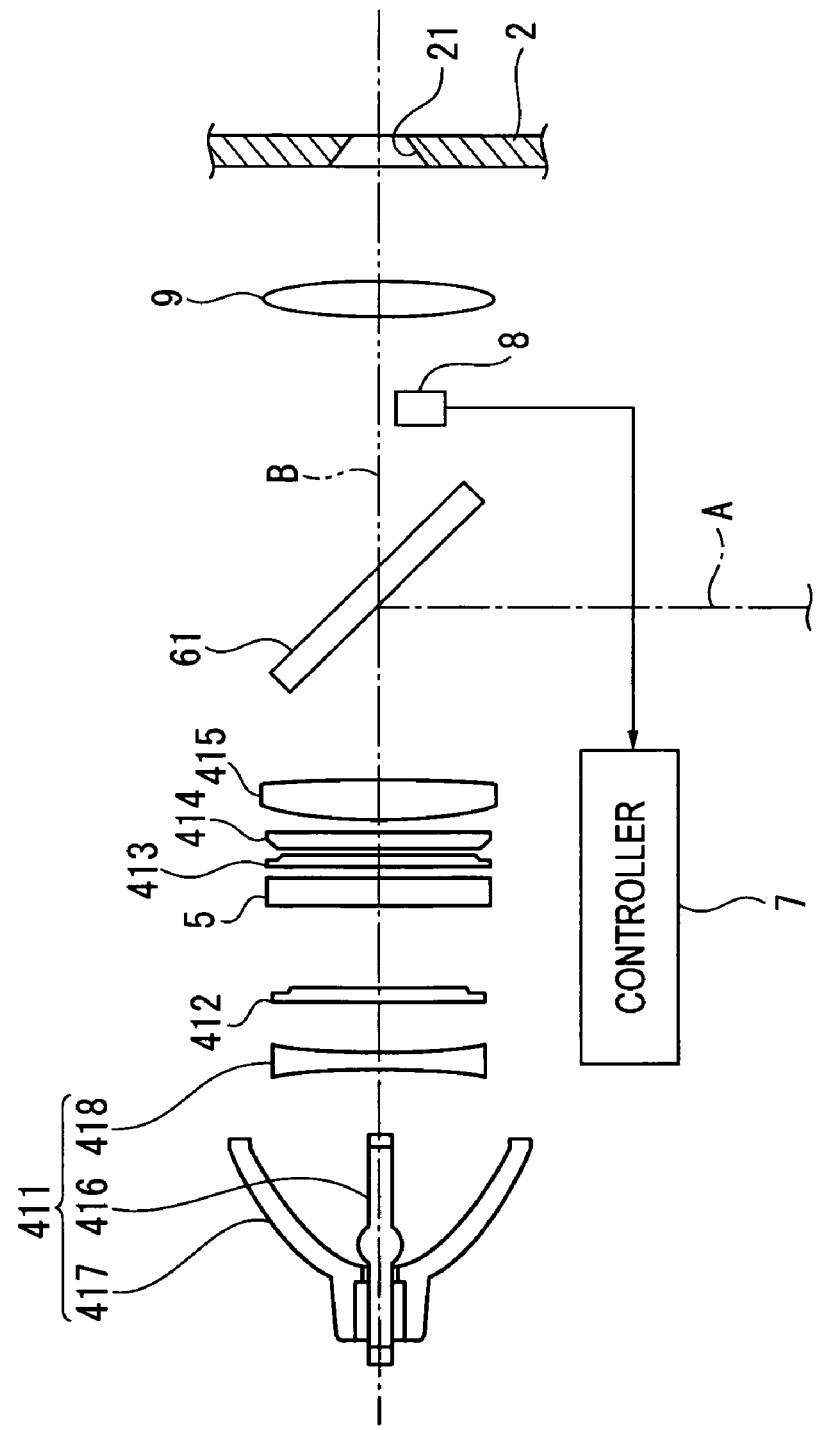
FIG. 8 is an illustration showing an arrangement of a nonvisible light eliminator of a second exemplary embodiment.

FIG. 8 is an illustration showing an arrangement of a nonvisible light eliminator of the second exemplary embodiment.

In the second exemplary embodiment, as shown in FIG. 8, a visible light reflection filter 61 is provided as the nonvisible light eliminator in place of the nonvisible light reflection filter 6 as the nonvisible light eliminator of the first exemplary embodiment. Accordingly, the shape of the illumination optical axis A of the second exemplary embodiment is different from that of the first exemplary embodiment. The second exemplary embodiment has the same arrangements as the first exemplary embodiment except for the nonvisible light reflection filter.

As shown in FIG. 8, like the nonvisible light reflection filter 6 described in the first exemplary embodiment, the visible light reflection filter 61 is disposed on the downstream side of the superposing lens 415 on the optical path (on the downstream side of the optical diaphragm 5 on the optical path) so as to be slant at a predetermined angle relative to the illumination optical axis A (for example, at 45 degrees). In contrast with the nonvisible light reflection filter 6 described in the first exemplary embodiment, the visible light reflection filter 61 is a so-called cold mirror that transmits the light beam in the nonvisible light region of the incident light beam and reflects the light beam in the visible light region.

As shown in FIG. 8, the visible light reflection filter 61 transmits the light beam in the nonvisible light region to guide the light beam in the nonvisible light region out of the optical path of the illumination optical axis A, thereby guiding the light beam in the nonvisible light region along an optical axis B. As shown in FIG. 8, the light beam in the visible light region which has been reflected by the visible light reflection filter 61 travels along the illumination optical axis A.

Although not shown in detail in the figures, on the downstream of the visible light reflection filter 61 on the optical path, the optical components 42 to 44 are disposed along the illumination optical axis A in the same manner as the first exemplary embodiment. As shown in FIG. 8, similarly to the first exemplary embodiment, the optical sensor 8, the condenser lens 9 and the nonvisible light transmitting section 21 are disposed along the optical axis B on which the light beam in the nonvisible light region having passed through the visible light reflection filter 61 travels.

When the visible light reflection filter 61 is alternatively employed in place of the nonvisible light reflection filter 6 like in the above-described second exemplary embodiment, the advantages same as the first exemplary embodiment can be obtained.

Third Exemplary Embodiment

Next, a third exemplary embodiment of the invention will be described below with reference to the attached drawings.

In the description below, the same reference numerals will be attached to the structures and components which are the same as the first exemplary embodiment to omit or simplify the detailed description thereof.

Figure 9:
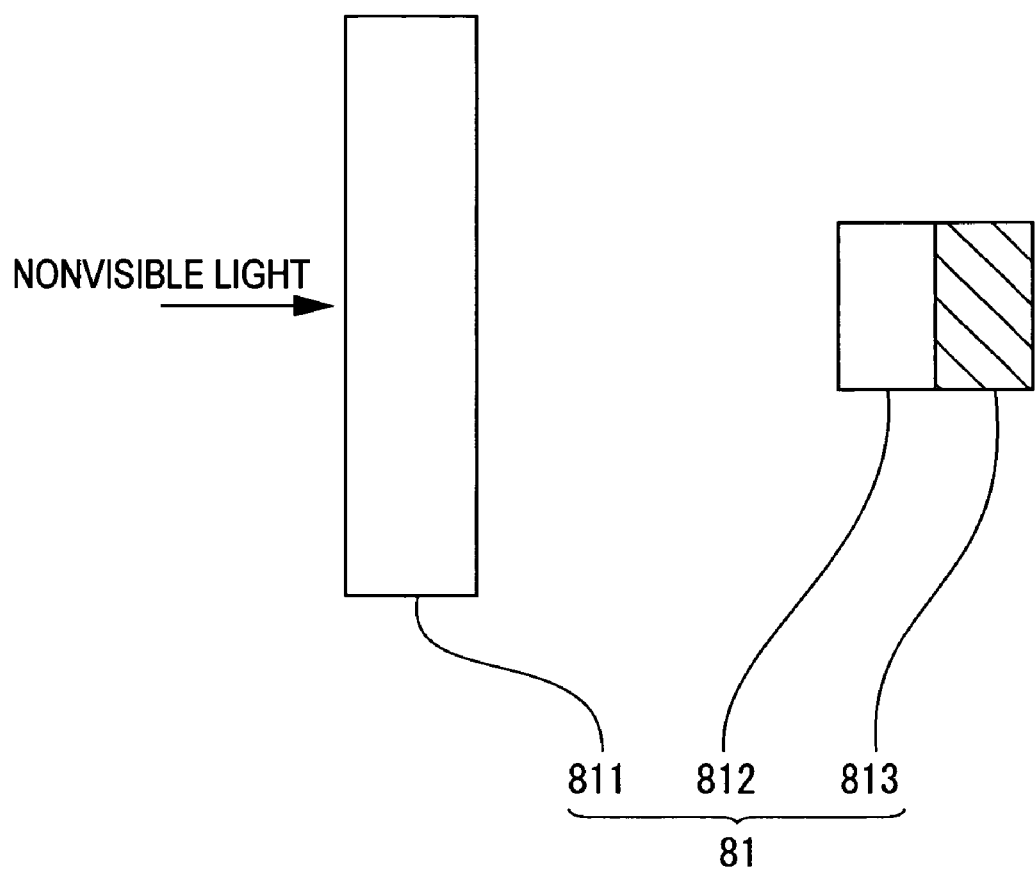
FIG. 9 is an illustration showing an arrangement of a nonvisible light detector of a third exemplary embodiment.

FIG. 9 is an illustration showing an arrangement of the nonvisible light eliminator of the third exemplary embodiment.

As shown in FIG. 9, the third exemplary embodiment is different from the first exemplary embodiment only in one point that a nonvisible light detector 81 is alternatively employed in place of the optical sensor 8 (nonvisible light detector). The third exemplary embodiment has the same arrangements as the first exemplary embodiment except for the nonvisible light detector 81.

The nonvisible light detector 81 is disposed in a similar position to that of the optical sensor 8 described in the first exemplary embodiment, the nonvisible light detector 81 receiving the light beam in the nonvisible light region which is reflected by the nonvisible light reflection filter 6 to output a light-receiving signal in accordance with light quantity of the received light beam in the nonvisible light region. As shown in FIG. 9, the nonvisible light detector 81 includes a light diffusion member 811, a light-reducing member 812 and an optical sensor 813.

The light diffusion member 811 diffuses the incident light beam in the nonvisible light region on a surface and/or the inside thereof to substantially equalize the luminance to irradiate. The light diffusion member 811 may be any member such as a frosted glass as long as the light diffusion member 811 can diffuse the incident light beam in the nonvisible light region on the surface and/or the inside thereof.

The light-reducing member 812 reduces the light quantity of the incident light beam in the nonvisible light region. The light-reducing member 812 may be any member such as an ND (Neutral Density) filter as long as the light-reducing member 812 can reduce the light quantity of the incident light beam in the nonvisible light region.

The optical sensor 813 may be a sensor similar to the optical sensor 8 described in the first exemplary embodiment.

According to the above-described third exemplary embodiment, since the light diffusion member 811 diffuses the light beam in the nonvisible light region to equalize the luminance, variations in the output values of the optical sensor 813 due to the positions of the optical sensor 813 can be avoided, thereby allowing the controller 7 to accurately control the optical diaphragm 5.

In addition, since the light-reducing member 812 reduces the light quantity of the light beam in the nonvisible light region, the light beam in the nonvisible light region can be supplied to the optical sensor 813 in accordance with the sensitivity of the optical sensor 813, so that the optical sensor 813 can appropriately receive the light beam in the nonvisible light region.

Fourth Exemplary Embodiment

Next, a fourth exemplary embodiment of the invention will be described below with reference to the attached drawings.

In the description below, the same reference numerals will be attached to the structures and components which are same as the first exemplary embodiment to omit or simplify the detailed description thereof.

Figure 10:
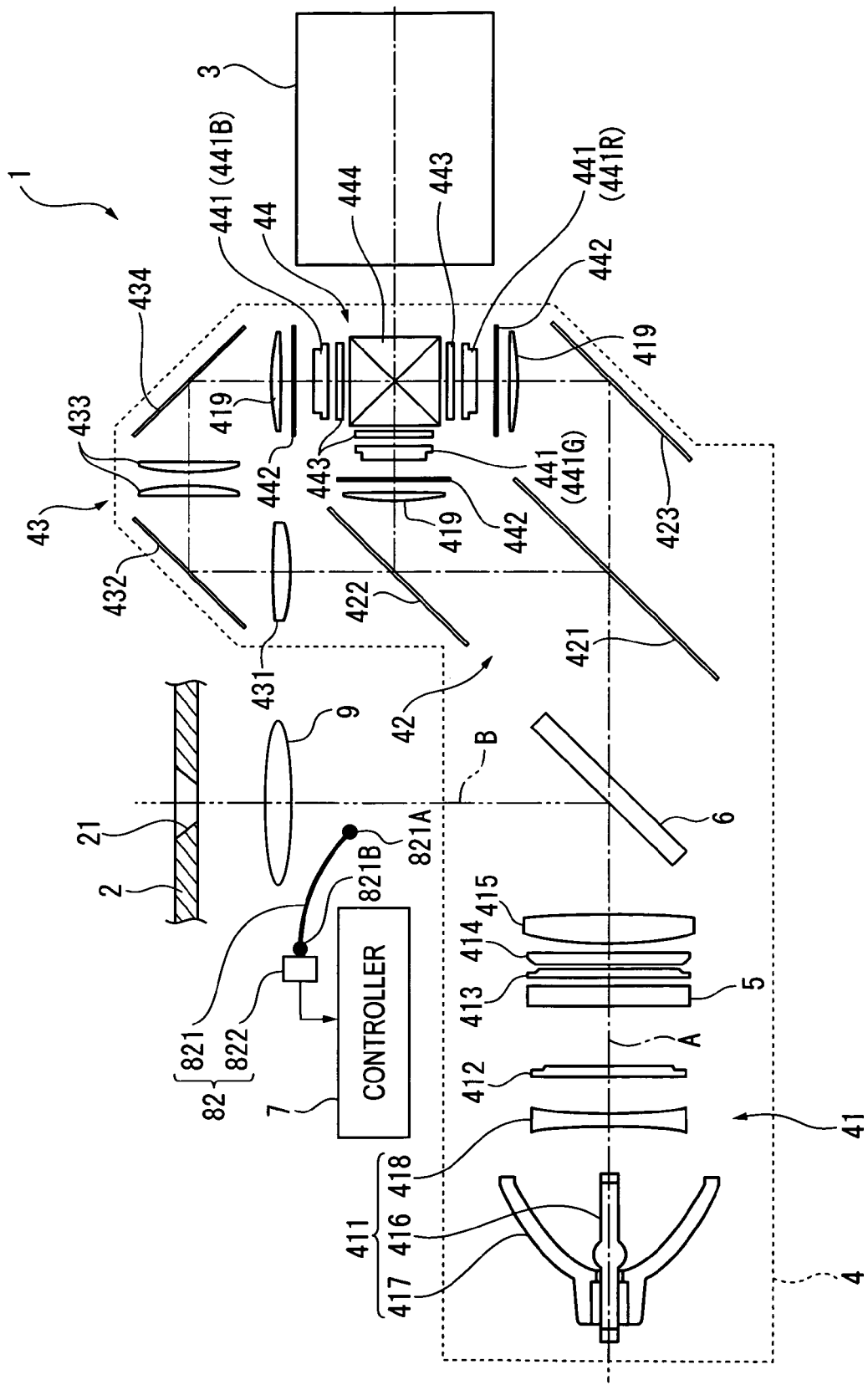
FIG. 10 is an illustration showing an arrangement of a nonvisible light detector of a fourth exemplary embodiment.

FIG. 10 is an illustration showing an arrangement of the nonvisible light detector of the fourth exemplary embodiment.

As shown in FIG. 10, the fourth exemplary embodiment is different from the first exemplary embodiment only in one point that a nonvisible light detector 82 is alternatively employed in place of the optical sensor 8 (nonvisible light detector). The fourth exemplary embodiment has the same arrangements as the first exemplary embodiment except for the nonvisible light detector 82.

Similarly to the optical sensor 8 described in the first exemplary embodiment, the nonvisible light detector 82 receives the light beam in the nonvisible light region which is reflected by the nonvisible light reflection filter 6 to output a light-receiving signal in accordance with light quantity of the received light beam in the nonvisible light region. As shown in FIG. 10, the nonvisible light detector 82 includes a nonvisible light guide section 821 and an optical sensor 822.

The nonvisible light guide section 821 irradiates the light beam incident on a first end 821A from a second end 821B, thereby guiding the light beam to a predetermined position. The nonvisible light guide section 821 may be an optical fiber cable, for example. As shown in FIG. 10, the nonvisible light guide section 821 is disposed such that the first end 821A is positioned at an irradiation position to which the light beam in the nonvisible light region reflected by the nonvisible light reflection filter 6 is irradiated and the second end 821B is positioned at a non-irradiation position to which the light beam in the nonvisible light region is not irradiated.

The optical sensor 822 may be a sensor similar to the optical sensor 8 described in the first exemplary embodiment. The optical sensor 822 is disposed adjacent to the second end 821B of the nonvisible light guide section 821 and receives the light beam in the nonvisible light region irradiated from the second end 821B.

Like the first exemplary embodiment, when the optical sensor 8 is disposed at the irradiation position to which the light beam in the nonvisible light region is irradiated, the temperature of the optical sensor 8 fluctuates due to the irradiated light beam in the nonvisible light region. The fluctuation in temperature may cause fluctuation in the output values of the optical sensor 8.

However in the fourth exemplary embodiment, since the nonvisible light guide section 821 guides the light beam in the nonvisible light region to a predetermined position, the optical sensor 822 can be disposed at the non-irradiation position to which the light beam in the nonvisible light region is not irradiated. Thus, the fluctuation in temperature of the optical sensor 8 which may be caused by the irradiation of the light beam in the nonvisible light region can be avoided, thereby preventing fluctuation in the output values of the optical sensor 822 which may be caused by the fluctuation in temperature. Hence, the controller 7 can accurately control the optical diaphragm 5.

Note that the scope of the invention is not restricted to the above-described exemplary embodiments, but includes modifications and improvements as long as an object of the invention can be achieved.

In the exemplary embodiments described above, the optical diaphragm 5 is arranged such that the four light shielding vanes 52 are rotated in the planes substantially orthogonal to the optical axis of the incident light beam, thereby moving the light shielding vanes 52 into and out of the optical path. However, the arrangement is not limited thereto and may be any as long as the light quantity of the light beam irradiated by the light source device 411 can be adjusted. For example, the light shield may be slid in a direction substantially orthogonal to the optical axis of the incident light beam to be moved into and out of the optical path, or the light shield may be rotated around a predetermined axis of the plane substantially orthogonal to the optical axis of the incident light beam to be moved into and out of the optical axis.

In the exemplary embodiments above, the number of the light shield is four, but the number is not limited thereto and may be one, two, three or more than five.

In the exemplary embodiments above, the electromagnetic actuator 58 is employed as a member for rotating the light shield, but the member is not limited thereto and may be an actuator of other drive system (such as static electricity, piezoelectricity, hydraulic pressure, pneumatic pressure or heat).

In the exemplary embodiments above, the electromagnetic actuator 58 is arranged such that the magnet coil 581 is used as the fixing member and the permanent magnet is used as the movable member, but the arrangement is not thereto and may be the other way around in which the permanent magnet 582 is used as the fixing member the magnet coil 581 is used as the movable member. This arrangement can reduce the weight of the movable member and accordingly allows the diaphragm ring 56 to be moved smoothly as compared with the exemplary embodiments above.

In the exemplary embodiments above, the electromagnetic actuator 58 is arranged such that the movable member is moved relative to the fixing member with the electromagnetic power, but the arrangement is not limited thereto. The movable member may be moved relative to the fixing member with magnetic force by using, for example, a stator for excitation.

In the exemplary embodiments above, the optical diaphragm 5 is disposed between the first lens array 412 and the second lens array 413, but the arrangement is not limited thereto. The optical diaphragm 5 may be disposed at any position as long as the optical diaphragm 5 is on the optical path of the light beam that is irradiated by the light source device 411 and travels to the liquid crystal panels 441.

In the exemplary embodiments above, the condenser lens 9 is employed as the light guide, but the arrangement is not limited thereto. The light guide may be any member as long as the nonvisible light eliminator can guide the light beam in the nonvisible light region which has been guided out of the optical path of the illumination optical axis A to a predetermined position. For example, the light guide may be a member for refracting the light beam in the nonvisible light region to the predetermined direction or an optical fiber cable described in the fourth exemplary embodiment.

The nonvisible light detectors 81, 82 respectively of the third and fourth exemplary embodiments may be employed in the arrangement of the second exemplary embodiment.

In the exemplary embodiments above, the optical sensors 8, 813, 822 for receiving the light beam in the nonvisible light region are employed as the nonvisible light detector. However, any member may be alternatively employed as long as the member can detect the light beam in the nonvisible light region. For example, the nonvisible light detector may be a member for detecting heat quantity caused by the irradiation of the light beam in the nonvisible light region (including a temperature detector such as a thermistor). Specifically, since the light quantity of the light beam in the nonvisible light region varies in accordance with the opening ratio of the optical diaphragm 5, the opening ratio of the optical diaphragm 5 and the heat quantity have a predetermined correlation. The controller 7 can identify the current opening ratio of the optical diaphragm 5 based on the predetermined correlation and a signal that is output in accordance with the heat quantity by the member.

In the exemplary embodiments above, the optical diaphragm 5 is controlled based on the light-receiving signal output by the nonvisible light detector 8, 81, 82, but the arrangement is not limited thereto. An object of the invention can be also attained in an arrangement in which data (drive signal) written in the liquid crystal panels 441 is corrected based on the light-receiving signal.

In the exemplary embodiments above, the nonvisible light is exhausted out of the projector 1 through the nonvisible light transmitting section 21, but the arrangement is not limited thereto. For example, a thermal transducer for transducing the nonvisible light to heat energy may be provided at the position of the nonvisible light transmitting section 21 or at positions on the downstream and upstream of the nonvisible light transmitting section 21 on the optical path of the nonvisible light. Specifically, the thermal transducer may be arranged with a nonvisible light absorber for transducing the nonvisible light to heat and a heat-radiation member such as a heat sink which is connected to the nonvisible light absorber to emit the heat in the nonvisible light absorber. For example, when the thermal transducer is disposed at a position on the downstream of the nonvisible light transmitting section 21 on the optical path, the nonvisible light exhausted out of the exterior casing 2 through the nonvisible light transmitting section 21 can be transduced to heat by the thermal transducer, so that the nonvisible light is not irradiated around the projector 1.

In the exemplary embodiments above, the projector 1 has the three liquid crystal panels 441, but the arrangement is not limited thereto. The invention may be applied to a projector including only one liquid crystal panel or two or four or more liquid crystal panels.

In the exemplary embodiments above, the transmissive liquid crystal panels 441 are employed as the optical modulator, but the arrangement is not limited thereto. For example, a reflective liquid crystal panel, a Digital Micromirror Device (a trademark of Texas Instruments Incorporated) or a GLV (Grating Light Valve) device (GLV and Grating Light Valve are trademarks of Silicon Light Machines) which utilizes diffraction phenomenon of light may be employed.

In the exemplary embodiments above, the front-type projector that projects an image in a direction for observing a screen is taken as an example, but the invention may be applied to a rear-type projector that projects an image in a direction opposite to the direction for observing the screen.

Although the best mode and the like for implementing the invention have been disclosed above, the invention is not limited thereto. In other words, while the invention has been mainly illustrated and described on the specific exemplary embodiments, a person skilled in the art can modify the arrangements such as shape, material, quantity and the like of the above-described exemplary embodiments without departing from the technical idea and scope of the invention.

Therefore, the description limiting the shapes, materials and the like disclosed above is intended to be illustrative for easier understanding but not to limit the invention, hence the invention includes a description using a name of the components without a part of or all of the limitation on the shapes, materials and the like.

The projector according to the invention can enhance image quality of a projection image and is useful as a projector for presentation or as a home theater system.

What is claimed is:

1. A projector including: a light source device; an optical modulator for modulating a light beam irradiated by the light source device; a projection optical device for projecting the light beam modulated by the optical modulator in an enlarged manner; and an exterior casing for housing the light source device, the optical modulator, and the projection optical device; the projector comprising:

an optical diaphragm disposed on an optical path between the light source device and the optical modulator, the optical diaphragm having a light shield for shielding at least a part of an incident light beam, the optical diaphragm adjusting light quantity of a light beam irradiated by the light source device by moving the light shield into and out of the optical path;

a nonvisible light eliminator disposed on the downstream of the optical diaphragm on the optical path, the nonvisible light eliminator reflecting or transmitting a light beam in the nonvisible light region of the light beam irradiated by the light source device to guide the light beam in the nonvisible region out of the optical path;

a nonvisible light detector for receiving the light beam in the nonvisible light region which is guided to be out of the optical path by the nonvisible light eliminator, the nonvisible light detector outputting a light-receiving signal; and a nonvisible light transmitting section being provided on the exterior casing for transmitting the light beam in the nonvisible light region, the exterior casing being structured to exhaust at least a part of the light beam in the nonvisible light region which is guided out of the optical path by the nonvisible light eliminator to the outside of the exterior casing.

2. The projector according to claim 1, further comprising: a diaphragm control device for controlling the optical diaphragm based on the light-receiving signal from the nonvisible light detector, the diaphragm control device locating the light shield at a predetermined position.

3. The projector according to claim 1, further comprising: a light guide for guiding the light beam in the nonvisible light region which is guided to be out of the optical path by the nonvisible light eliminator to the nonvisible light transmitting section.

* * * * *